(12) United States Patent
Ophir et al.

(10) Patent No.: US 8,559,944 B2
(45) Date of Patent: Oct. 15, 2013

(54) SYSTEM AND METHOD FOR IDENTIFYING ROAMING-SPECIFIC COST SAVING USAGE PATTERNS

(75) Inventors: Shai Ophir, Moshav Ein-Vered (IL); Shlomo Wolfman, Hod-HaSharon (IL); Shany Elkarat, Tel-Mond (IL); Amit Daniel, Tel-Mond (IL); Roy Shloman, Tel-Aviv (IL); Ofer Lavi Ben-David, Herzlia (IL); Sharon Aran, Herzlia (IL); Li-On Raviv, Petach Tikva (IL); Yaron Sabbag, Shoham (IL); Nir Zohar, Rishon-LeZion (IL); Shachar Inbar, Ramat-Gan (IL); Shai Eilat, Tel-Aviv (IL); Ziv Dvir, Tel-Aviv (IL); Roee Froman, Hod-HaSharon (IL); Ofir Sviezki, Hod-HaSharon (IL); Yossi Eini, Rishon-LeZion (IL); Yoav Kantor, Ramat-HaSharon (IL); Edy Rozenfeld, Yahud (IL); Shounit Swissa, Ganei-Am (IL)

(73) Assignee: StarHome GmbH, Zurich (CH)

( * ) Notice: Subject to any disclaimer, the term of this patent is extended or adjusted under 35 U.S.C. 154(b) by 284 days.

(21) Appl. No.: 13/050,150

(22) Filed: Mar. 17, 2011

(65) Prior Publication Data

US 2011/0230164 A1    Sep. 22, 2011

Related U.S. Application Data

(60) Provisional application No. 61/315,049, filed on Mar. 18, 2010.

(51) Int. Cl.
*H04W 4/00* (2009.01)

(52) U.S. Cl.
USPC ............... 455/432.3; 455/432.1; 455/406

(58) Field of Classification Search
USPC ................... 455/432.1, 406, 432.3
See application file for complete search history.

(56) References Cited

U.S. PATENT DOCUMENTS

| | | | |
|---|---|---|---|
| 2002/0151305 A1* | 10/2002 | Ward et al. | 455/436 |
| 2006/0025131 A1* | 2/2006 | Adamany et al. | 455/432.1 |
| 2006/0178135 A1* | 8/2006 | Jiang et al. | 455/414.1 |
| 2010/0173628 A1* | 7/2010 | Hosain et al. | 455/432.1 |
| 2011/0039518 A1* | 2/2011 | Maria | 455/406 |

* cited by examiner

*Primary Examiner* — Justin Lee

(57) ABSTRACT

Apparatus located at a first mobile telephony network, said network comprising a detector for detecting at least one of roaming registration signals and session management signals of roaming mobile telephony users of said first mobile telephony network who are roaming at another mobile telephony networks; and an analytics unit, associated with said detector, for analyzing said detected signals per individual roaming users, and identifying, from said signals, any one of a plurality of predefined cost saving behaviors of respective individual roaming users. The analytics unit provides an identification output for any of said individual roaming users who is identified to be engaging in one of said predefined cost saving behaviors.

20 Claims, 2 Drawing Sheets

SYSTEM AND METHOD FOR IDENTIFYING ROAMING-SPECIFIC COST SAVING USAGE PATTERNS

RELATIONSHIP TO EXISTING APPLICATIONS

This application claims the benefit of priority under 35 USC 119(e) of U.S. Provisional Patent Application No. 61/315,049 filed Mar. 18, 2010, the contents of which are incorporated herein by reference in their entirety.

FIELD AND BACKGROUND OF THE INVENTION

The present invention relates to a system and method for identifying roaming specific cost saving usage patterns and, more particularly, but not exclusively to using such usage patterns to identify roaming network users whose potential is not being fulfilled.

In the cellular market there are systems for monitoring mobile roaming traffic. The systems may be located in the home network or the roaming network, and monitor the international links between the networks. When a mobile roamer is registered in a roaming (visited) network, the registration must be approved by the home network; hence there is a signaling transaction between the two networks which can be monitored. Other transactions related to call control, SMS, data roaming and charging can be monitored. The current systems are mainly based on SS7 mobility probes, monitoring the SS7 TCAP, MAP, CAMEL or ISUP messages, via the international links, or monitoring the data traffic based on GPRS, SIP, Diameter and other IP-based protocols (but not limited to these). The systems may also collect and process the call data records (CDRs) created for roaming actions, either on-line or off-line, mainly for billing purposes. The systems may have databases for aggregating the information regarding roaming subscribers. The home network is the network owning the subscribers, even while they are roaming in a foreign network; hence it has the capabilities and authorization to aggregate the data, under the privacy regulations.

It is common for users when travelling to keep their mobile telephones with them but to modify their usage so as not to incur high charges. The problem for the cellular network operator is to discourage modified usage and to encourage roaming usage to be as close as possible to home or domestic usage.

SUMMARY OF THE INVENTION

According to one aspect of the present invention there is provided apparatus located at a first mobile telephony network, the network comprising:

a detector for detecting at least one of roaming registration signals and session management signals of roaming mobile telephony users of a home mobile telephony network who are roaming at another mobile telephony network; and an analytics unit, associated with the detector, for analyzing the detected signals per individual roaming users, and identifying, from the signals, any one of a plurality of predefined cost saving behaviors of respective individual roaming users;

wherein the analytics unit is configured to provide an identification output for any of the individual roaming users who is identified to be engaging in one of the predefined cost saving behaviors.

In an embodiment, the first mobile telephony network is the home network.

In an embodiment, the first mobile telephony network is the another network at which the user is roaming.

In an embodiment, the predetermined behavior comprises using a foreign SIM card, and the analytics unit is configured to discover that a respective user is not registered in any domestic network visitor location registers VLRs, or in components of the home network, and that a forward to number—FTN—of the respective user is directed to a foreign number.

In an embodiment, the analytics unit is further configured to identify a SIM replacement made at a roaming network by detecting an initial roaming registration with an original home network SIM card from the home network.

In an embodiment, the predetermined behavior comprises turning on a respective roaming mobile telephone for making outgoing calls only, and the analytics unit is configured to identify a respective user as a roaming user from a roaming registration—MAP Update Location—, and then to infer the behavior from a closely following CANCEL message.

In an embodiment, the predetermined behavior comprises turning on a respective roaming mobile telephone for making outgoing calls only, and the analytics unit is configured to identify a respective user as a roaming user from a roaming registration—MAP Update Location—and then to perform a MAP Any Time Interrogation—ATI—to either a home location register—HLR—or a serving VLR to find out about the availability status of the handset.

In an embodiment, the predetermined behavior comprises not answering incoming calls, the analytics unit being configured to monitor mobile terminated—MT—calls directed to roaming users, that are not answered and deduce the behavior from a predetermined threshold of the calls which are not answered.

In an embodiment, the predetermined behavior comprises using a call screening service, the analytics unit being configured to determine whether a respective user is roaming and whether a call screening service is in use with respect to the respective user.

In an embodiment, the behavior comprises using call backs and the analytics unit is configured to detect a call-back message and any calls made to the respective user within a predetermined short period of time that is identifiable with the detected call-back message.

In an embodiment, the call-back message is a USSD message detectable via MAP links.

In an embodiment, the call back message comprises the respective user calling and disconnecting, —which call back message is then matched with a call back made from the previous destination number, after a short period, the matching thereby identifying the behavior.

In an embodiment, a respective user has an established ratio between incoming and outgoing calls and wherein upon roaming the ratio changes, the analytics unit being configured to detect the change in ratio for the respective user as an indication of the cost saving behavior.

In an embodiment, the behavior comprises making very short and/or very few calls, and wherein the analytics unit is configured to detect a usage pattern of accumulated calls of a given user during roaming and compare the usage pattern with data of home network usage, thereby to identify the behavior.

In an embodiment, the behavior comprises a reduction in data usage during roaming compared to usage at the home network, and wherein the analytics unit is configured to detect a data usage pattern of a given user during roaming and compare the usage pattern with a pattern of home network data usage, thereby to identify the behavior.

In an embodiment, the behavior comprises using data only and not using voice, and the analytics unit is configured to detect roaming registration at a visited network, and to identify those users wherein the roaming registration is followed exclusively by data sessions.

In an embodiment, the detection of data sessions comprises detection of general packet radio service—GPRS—sessions.

In an embodiment, the detection of WiFi sessions using data provided by a roaming network operator, or from Voice Call Continuity data—VCC—or from data provided when a home mobile operator Radius server is used for authentication of the WiFi session.

In an embodiment, the analytics unit is further configured to analyze the data session to identify voice over IP—VoIP—traffic.

According to a second aspect of the present invention there is provided a method for identifying roaming mobile telephony users using cost-saving strategies, the method carried out on mobile telephony networks, the method comprising:

detecting at least one of roaming registration signals and session management signals of roaming mobile telephony users of a home mobile telephony network who are roaming at another mobile telephony network; and analyzing the detected signals per individual roaming users, and identifying, from the signals, any one of a plurality of predefined cost saving behaviors of respective individual roaming users;

providing an identification output for any of the individual roaming users who is identified to be engaging in one of the predefined cost saving behaviors.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof. This refers in particular to tasks involving call control.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
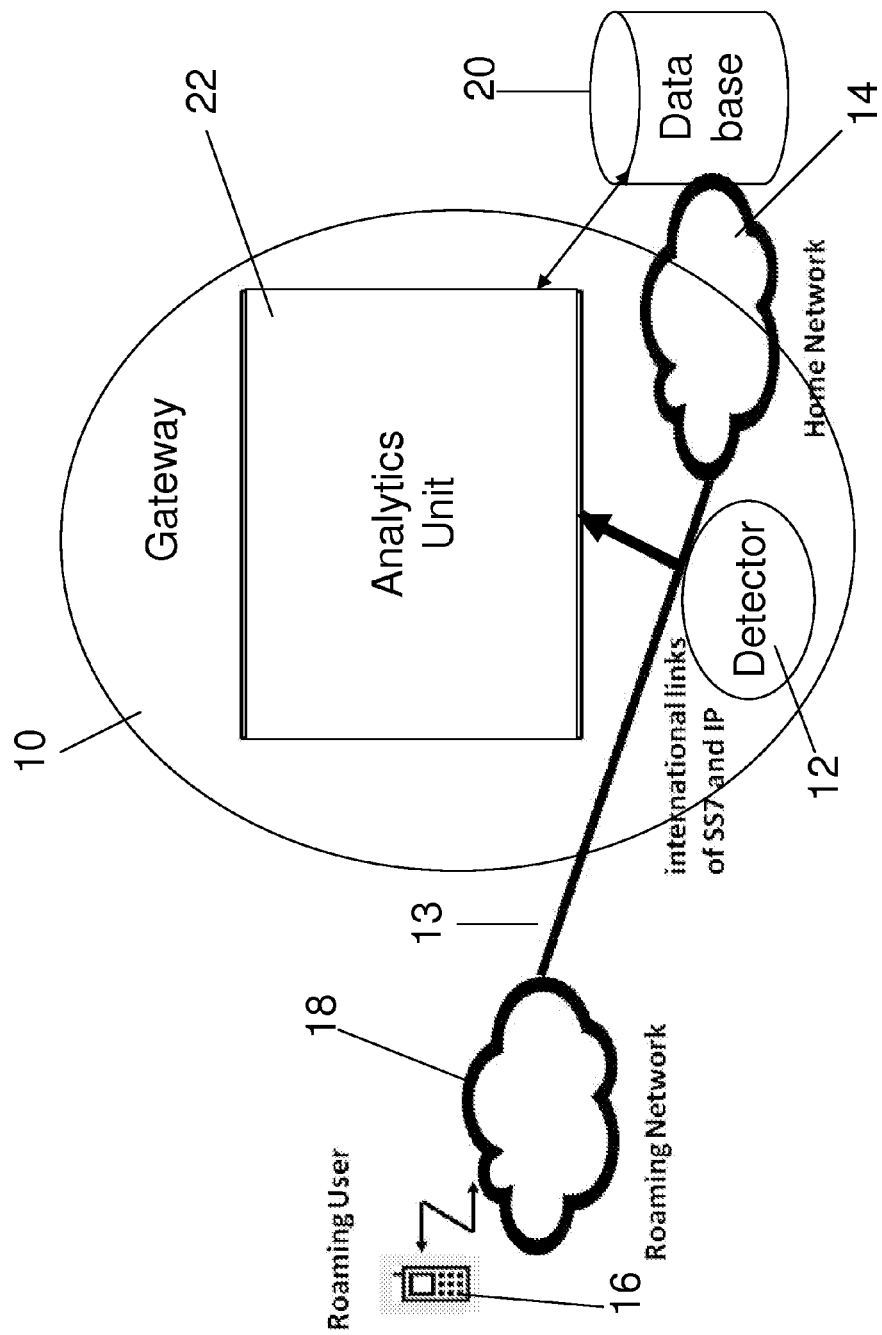
FIG. 1 is a simplified block diagram illustrating a system using a gateway apparatus according to the present embodiments.

The present embodiments comprise apparatus and a method for detecting various kinds of cost saving behaviors amongst roaming users, inter alia with the aim of offering the roaming user an appropriate package for his or her needs.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1 which illustrates an apparatus 10, hereinafter referred to as a gateway. The gateway may normally be located at the home network, so as to monitor and analyze the subscribers of the home network. However a visited network may also be supplied with such a gateway to analyze and offer discounts or use packages to the inbound roamer. This is especially the case for LTE.

The gateway is thus located at either a home or a roaming telephony network, meaning it deals with either or both of inbound and outbound roaming users. In FIG. 1 the gateway is shown to be associated with the home network but this is purely exemplary. The gateway includes a detector 12 which detects Inter-network (typically international) call control signaling at SS7 or IP Network links 13. The call control signaling may include roaming registration signals in particular and session management signals in general of roaming mobile telephony users 16 of home mobile telephony network 14 who are roaming at another mobile telephony network such as network 18.

An analytics unit 20 is associated with the detector 12 and analyzes the detected signals against information of individual users available from database 22. Database 22 is a database of the users of the network 14, for example the home location register HLR in the case of a GSM network. The analytics unit 20 has the task of identifying from the signals, users who are making use of cost-cutting behaviors or strategies. Should such a cost-cutting behavior be detected then an identification output is provided which identifies the particular roaming user involved and the particular user may be offered a roaming usage package to help him or her make better use of the services available.

Roaming tariffs in the mobile world are very high compared to local (domestic) tariffs. The present embodiments relate to discovering roaming-specific patterns of behavior and usage of roaming subscribers, which may be caused by the need for cost-saving. These usage patterns are not natural to the mobile user and are significantly different from the usage patterns shown by the subscriber at the home network. Most of these patterns cause a great deal of inconvenience to the roaming subscriber.

A goal of the present embodiments therefore is to identify the users adopting these kinds of behaviors, and to enable the mobile operator to offer them convenient solutions which encourage them to use mobile services in the same way that they use the networks at home.

Cost-saving roaming behavior can be identified inter alia by any of the following non-limiting list of patterns:
1. Replacing the home network SIM card with a foreign SIM card. This allows the user to make cheap local calls but has the disadvantage of being unable to receive calls that were dialed to the original number, unless using a call forwarding service;
2. Turning on the mobile for MO (Mobile Originated) calls only;
3. Not answering incoming calls (MT or Mobile Terminated calls);
4. Maintaining black lists/white lists for call screening, with or without access codes;
5. Using USSD call back or self-implemented call back (calling the destination, then disconnecting, and expect the destination to call back);
6. Making only very short and very few calls, as compared with the user's habits while in the home network;
7. not using data roaming at all, as compared with the user's habits while in the home network (for example, users of Push Mail devices)
8. Using data-only while in roaming—users may avoid voice and SMS usage while roaming and use their handset with GPRS and/or WiFi for communicating. For example users may use Skype™, etc. over WiFi, which is often provided for free in Cafés and other public spaces. Other users may use GPRS, depending on the terms under which they use GPRS.

The above patterns may be identified by analyzing roaming events. The events may be collected by the monitoring systems described in the above section. Analysis, or hereinafter analytics, may be provided to detect any or all of the relevant cases.

Figure 2:
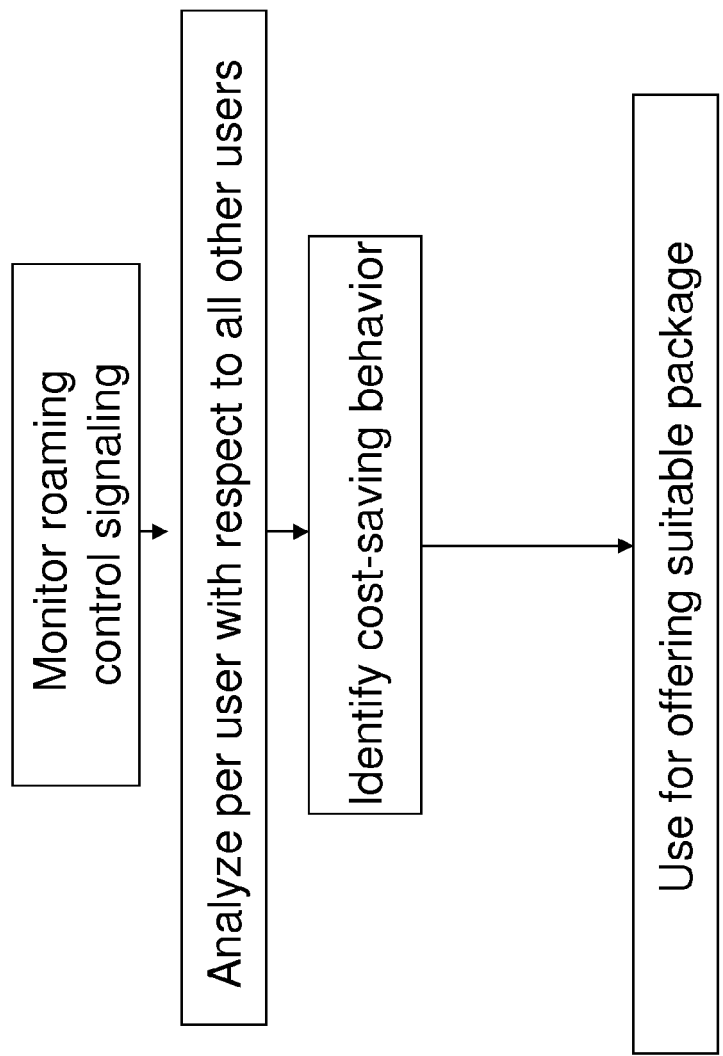
FIG. 2 is a flow chart illustrating use of the gateway of FIG. 1.

Reference is now made to FIG. 2, which is a flow chart illustrating the identification of the various cost saving behaviors. The gateway monitors the control signaling and analyzes per user, with reference to the local database. If the user is discovered to be roaming and a particular behavior indicating a cost saving strategy is detected then the gateway identifies the user so that the user can be sent a suitable package to encourage normal use of the roaming facilities and services.

Following are exemplary methods for the analytics for the above eight cases. In the following the cases are exemplified in the case of GSM/3G networks, but the embodiments are not limited to GSM networks:

The behavior involves using a foreign SIM card or a (U)SIM card. Hereinafter, reference to a SIM card includes reference to a (U)SIM card. The analytics unit discovers that the user is not registered in any of the domestic network VLRs (in case of GSM network), or in any other components of the home network, and that his FTN (Forward-To-Number) is directed to a foreign number. If the SIM replacement is made abroad, the initial roaming registration with the original SIM card (MAP Update Location message in GSM/3G networks) can be monitored at the home network. In non-GSM networks other entities than a VLR, such as MMEs, or mobile management entities, may be involved.

The behavior involves turning on the mobile for making outgoing calls only: The analytics unit identifies the user as a roamer according to the roaming registration (MAP Update Location), then a CANCEL message is received due to the fact that the roamer is not available for a long duration. An alternative is to perform a MAP ATI (Any Time Interrogation) query—or other suitable MAP queries—to the HLR or the serving VLR and find out about the availability status of the handset. In non-GSM networks, Diameter queries may be used.

More specifically, the analytics unit may identify a respective user as a roaming user from a roaming registration—MAP or Diameter Update Location—and then perform a MAP Any Time Interrogation—ATI—or an equivalent Diameter user profile command to either a home location register—HLR or an HSS—or a serving VLR or an MME to find out about the availability status of the handset.

The behavior involves not answering incoming calls (MT—Mobile Terminated calls): The analytics unit monitors MT calls for roaming users, and notices that the calls were not answered and may have been forwarded to the voicemail or to other numbers, via Late Call Forwarding (after not being answered) or Early Call Forwarding (where the call is not routed to the roamer at all. In the latter case there is no need to monitor MT roaming calls, but it is necessary instead to check the FTN status during roaming—the fact that the user is in roaming should be monitored.

The behavior involves using call screening. The analytics unit checks if the user is using a call screening service while in roaming, and the fact that the user is in roaming is being monitored.

The behavior involves use of call backs. In the case of USSD call back, the USSD may be monitored via the MAP links, and then a call back to the roamer may be identified from the previous destination, after a short period and matched with the USSD. In the case of a provisional call back, where the roamer calls and disconnects, —the pattern of calls made and then disconnected before being answered may be recognized, and then matched with the call back made from the previous destination number, after a short period. Another method may comprise the detection of a non-proportional ratio between incoming and outgoing calls for specific roamers.

The behavior involves the roamer making very short and/or very few calls. In this case the analytics unit monitors the pattern of accumulated calls made by roamers over the course of traveling, and compares the analysis with data gathered from the home network regarding the general usage patterns of the subscriber.

The behavior involves Roamers not using data roaming, or hardly using data roaming. The analytics unit again compares usage patterns during roaming with usage patterns otherwise and detects an anomaly.

The behavior involves using data only. The analytics unit detects roaming registration at a visited network, followed by GPRS sessions only—in the case that the data sessions are GPRS sessions. WiFi can be detected if the data is provided by the roaming mobile operator via VCC (Voice Call Continuity). Alternatively the WiFi detection may come from the home mobile operator Radius server for authentication, or by any other mean. The session may be analyzed to identify VoIP traffic (such as Skype or SIP).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus located at a first mobile telephony network, said network comprising:
    a detector for detecting at least one of roaming registration signals and session management signals of roaming mobile telephony users of a home mobile telephony network who are roaming at another mobile telephony network; and
    an analytics unit, associated with said detector, for analyzing said detected signals per individual roaming users, and identifying, from said signals, any one of a plurality of predefined cost saving behaviors of respective individual roaming users;
    wherein said analytics unit is configured to provide an identification output for any of said individual roaming users who is identified to be engaging in one of said predefined cost saving behaviors and said predefined cost saving behaviors comprise using at least one member of the group comprising a foreign SIM card and a (U)SIM card, and said analytics unit is configured to discover that a respective user is not registered in any domestic network visitor location registers, said registers comprising at least one member of the group consisting of VLRs and Mobility Management Entities (MMEs), or in components of the home network, and that a forward to number—FTN—of said respective user is directed to a foreign number.

2. The apparatus of claim 1, wherein the first mobile telephony network is the home network.

3. The apparatus of claim 1, wherein the first mobile telephony network is said another network at which said user is roaming.

4. The apparatus of claim 1, wherein said analytics unit is further configured to identify a SIM replacement made at a roaming network by detecting an initial roaming registration with an original home network SIM card from said home network.

5. The apparatus of claim 4, wherein said identification of a replacement SIM card is made in the absence of said registration being followed by subsequent registrations of an original SIM card to the roaming network.

6. The apparatus of claim 1, wherein said predefined cost saving behavior comprises turning on a respective roaming mobile telephone for making outgoing calls only, and said analytics unit is configured to identify a respective user as a roaming user from a roaming registration—MAP/Diameter Update Location —, and then to infer said behavior from a CANCEL message.

7. The apparatus of claim 1, wherein said predefined cost saving behavior comprises turning on a respective roaming mobile telephone for making outgoing calls only, and said analytics unit is configured to identify a respective user as a roaming user from a roaming registration—MAP/Diameter Update Location—and then to perform a MAP Any Time Interrogation—ATI—or an equivalent Diameter user profile command to either a home location register—HLR or an HSS—or a serving VLR or an MME to find out about the availability status of the handset.

8. The apparatus of claim 1, wherein said predefined cost saving behavior comprises not answering incoming calls, the analytics unit being configured to monitor mobile terminated—MT—calls directed to roaming users, that are not answered and deduce said behavior from a predetermined threshold of said calls which are not answered.

9. The apparatus of claim 1, wherein said predefined cost saving behavior comprises using a call screening service, said analytics unit being configured to determine whether a respective user is roaming and whether a call screening service is in use with respect to said respective user.

10. The apparatus of claim 1, wherein said predefined cost saving behavior comprises using call backs and said analytics unit is configured to detect a call-back message and any calls made to the respective user within a predetermined short period of time that is identifiable with the detected call-back message.

11. The apparatus of claim 10, wherein said call-back message is a USSD message detectable via MAP links.

12. The apparatus of claim 1, wherein a respective user has an established ratio between incoming and outgoing calls and wherein upon roaming said ratio changes, said analytics unit being configured to detect said change in ratio for said respective user as an indication of said cost saving behavior.

13. The apparatus of claim 1, wherein said predefined cost saving behavior comprises using data only and not using voice, and said analytics unit is configured to detect roaming registration at a visited network, and to identify those users wherein said roaming registration is followed exclusively by data sessions.

14. The apparatus of claim 13, wherein said detection of data sessions comprises detection of general packet radio service—GPRS—sessions.

15. The apparatus of claim 13, wherein said detection of data sessions comprises detection of WiFi sessions using data provided by a roaming network operator, or from data provided when a home mobile operator Radius server is used for authentication of the WiFi session.

16. The apparatus of claim 13, wherein said analytics unit is further configured to analyze said data session to identify voice over IP—VoIP—traffic.

17. Apparatus located at a first mobile telephony network, said network comprising:
a detector for detecting at least one of roaming registration signals and session management signals of roaming mobile telephony users of a home mobile telephony network who are roaming at another mobile telephony network; and
an analytics unit, associated with said detector, for analyzing said detected signals per individual roaming users, and identifying, from said signals, any one of a plurality of predefined cost saving behaviors of respective individual roaming users;
wherein said analytics unit is configured to provide an identification output for any of said individual roaming users who is identified to be engaging in one of said predefined cost saving behaviors; wherein said predefined cost saving behavior comprises using call backs and said analytics unit is configured to detect a call-back message and any calls made to the respective user within a predetermined short period of time that is identifiable with the detected call-back message; and wherein said call back message comprises the respective user calling and disconnecting, —which call back message is then matched with a call back made from the previous destination number, after a short period, said matching thereby identifying said behavior.

18. Apparatus located at a first mobile telephony network, said network comprising:
a detector for detecting at least one of roaming registration signals and session management signals of roaming mobile telephony users of a home mobile telephony network who are roaming at another mobile telephony network; and
an analytics unit, associated with said detector, for analyzing said detected signals per individual roaming users, and identifying, from said signals, any one of a plurality of predefined cost saving behaviors of respective individual roaming users;
wherein said analytics unit is configured to provide an identification output for any of said individual roaming users who is identified to be engaging in one of said predefined cost saving behaviors, wherein said predefined cost saving behavior comprises making very short and/or very few calls, and wherein said analytics unit is configured to detect a usage pattern of accumulated calls of a given user during roaming and compare said usage pattern with data of home network usage, thereby to identify said behavior.

19. Apparatus located at a first mobile telephony network, said network comprising:
a detector for detecting at least one of roaming registration signals and session management signals of roaming mobile telephony users of a home mobile telephony network who are roaming at another mobile telephony network; and
an analytics unit, associated with said detector, for analyzing said detected signals per individual roaming users, and identifying, from said signals, any one of a plurality of predefined cost saving behaviors of respective individual roaming users;
wherein said analytics unit is configured to provide an identification output for any of said individual roaming users who is identified to be engaging in one of said predefined cost saving behaviors, wherein said predefined cost saving behavior comprises a reduction in data usage during roaming compared to usage at the home network, and wherein said analytics unit is configured to detect a data usage pattern of a given user during roaming and compare said usage pattern with a pattern of home network data usage, thereby to identify said predefined cost saving behavior.

20. Method for identifying roaming mobile telephony users using cost-saving strategies, the method carried out on mobile telephony networks, the method comprising:
detecting at least one of roaming registration signals and session management signals of roaming mobile telephony users of a home mobile telephony network who are roaming at another mobile telephony network; and
analyzing said detected signals per individual roaming users, and identifying, from said signals, any one of a plurality of predefined cost saving behaviors of respective individual roaming users;
providing an identification output for any of said individual roaming users who is identified to be engaging in one of said predefined cost saving behaviors, wherein said predefined cost saving behavior comprises using at least one member of the group comprising a foreign SIM card and a (U)SIM card, and said analytics unit is configured to discover that a respective user is not registered in any domestic network visitor location registers, said registers comprising at least one member of the group consisting of VLRs and Mobility Management Entities (MMEs), or in components of the home network, and that a forward to number—FTN—of said respective user is directed to a foreign number.

* * * * *